United States Patent [19]
Pittman

[11] Patent Number: 6,074,509
[45] Date of Patent: Jun. 13, 2000

[54] HIGH STRENGTH, LIGHTWEIGHT PRESSURIZED STRUCTURE FOR USE AS THE SKIN OF A SPACECRAFT OR OTHER VEHICLE

[76] Inventor: Douglas E. Pittman, 317 Fern Ave., Westmont, N.J. 08108

[21] Appl. No.: 08/932,143

[22] Filed: Sep. 16, 1997

Related U.S. Application Data

[62] Division of application No. 08/551,841, Nov. 6, 1995, Pat. No. 5,716,693.

[51] Int. Cl.⁷ .............................. B32B 31/00; B29C 63/00
[52] U.S. Cl. ................. 156/213; 156/275.1; 156/288; 264/241; 264/405; 264/494
[58] Field of Search ..................... 156/60, 292, 213, 156/275.1, 285, 288, 290, 296; 264/171.12, 405, 494, 241

[56] References Cited

U.S. PATENT DOCUMENTS

| | | | |
|---|---|---|---|
| 3,013,641 | 12/1961 | Compton | 189/34 |
| 3,596,622 | 8/1971 | Moore | 114/69 |
| 3,742,663 | 7/1973 | Duskin | 52/145 |
| 3,865,679 | 2/1975 | Hale | 161/68 |
| 3,876,492 | 4/1975 | Schott | 161/68 |
| 4,043,721 | 8/1977 | Lemelson | 425/116 |
| 4,052,025 | 10/1977 | Clark et al. | 244/25 |
| 4,301,584 | 11/1981 | Dillner et al. | 29/156.8 B |
| 4,730,797 | 3/1988 | Minovitch | 244/159 |
| 4,808,457 | 2/1989 | Kruck et al. | 428/69 |
| 5,204,161 | 4/1993 | Pettit et al. | 428/174 |
| 5,266,379 | 11/1993 | Schaeffer et al. | 428/178 |
| 5,424,113 | 6/1995 | Ray et al. | 428/178 |

OTHER PUBLICATIONS

PCT International Search Report dated Mar. 28, 1997, 2 pages.

*Primary Examiner*—Donald Loney
*Attorney, Agent, or Firm*—Woodcock Washburn Kurtz Mackiewicz & Norris LLP

[57] ABSTRACT

A sandwich skin construction that is comprised of an internal structure comprising a plurality of cones disposed between two outer skins is disclosed. The interior contains a pressurized gas to give the resulting sandwich skin construction added strength over a similarly constructed non-pressurized structure of the same material with an equivalent mass. Various attributes of the cones can be adjusted, for example, size and angle, to optimize the performance of the sandwich skin construction to a variety of external stresses. Moreover, a method is provided for manufacturing the sandwich skin construction. The structure can be placed in a pressurized environment before attaching the outer skins.

10 Claims, 8 Drawing Sheets

HIGH STRENGTH, LIGHTWEIGHT PRESSURIZED STRUCTURE FOR USE AS THE SKIN OF A SPACECRAFT OR OTHER VEHICLE

CROSS REFERENCE TO RELATED APPLICATION

This is a divisional of U.S. Application Ser. No. 08/551,841 filed Nov. 6, 1995, now U.S. Pat. No. 5,716,693, the disclosure of which is herein incorporated by reference.

FIELD OF THE INVENTION

The present invention relates generally to sandwich skin constructions. More particularly, the invention relates to high strength, lightweight constructions for vehicle skins.

BACKGROUND OF THE INVENTION

Low density sandwich skin constructions have numerous applications, particularly as non-structural skins for spacecraft, aircraft, cars and other vehicles. Typically, these sandwich skin constructions consist of a lightweight core material wrapped with a thin-gauge outer skin. The interior is usually selected to provide strength and stability to the outer skins. Typical skins are fabricated from metal, plastic, composite, or other materials chosen for desired characteristics. In addition, a variety of core structures and materials have been used, including honeycomb structures, foams and resins.

Prior art sandwich skin constructions derive strength through either a rigid inner core or through a rigid outer skin. In either of these selections, the overall strength to weight ratio of the sandwich skin construction is not maximized. Although sandwich skin constructions are generally lighter than solid skins of equivalent thickness, a trade-off is still required; either the sandwich skin construction is not as strong as it could be, or it is not as light as it could be. However, in some applications of these sandwich skin constructions, such as aircraft and spacecraft skins, the strength to weight ratio is crucial.

Additionally, because of the various layers, sandwich skin constructions tend to react poorly to sheer forces. For example, sheer forces exerted on one skin surface, if not adequately transferred to the core or other surface, cause separation of the skin from the core.

Thus, there is a need for an improved sandwich skin construction that is high strength and lightweight.

SUMMARY OF THE INVENTION

The present invention provides a sandwich skin construction comprising an internal structure of cones coupled side-by-side so that each cone is inverted with respect to each adjacent cone. This internal structure is pressure sealed between two outer skins. Moreover, each individual cone is pressure sealed against the outer skins to localize pressure loss in the event of a skin puncture.

According to an aspect of the invention, the interior of the structure is pressurized with a gas. Preferably, this gas comprises helium to provide a convenient method of detecting leaks in the structure. According to another aspect of the invention, the angle of each cone can be adjusted to oppose the direction of expected external force acting upon the structure in a given application. Thus, the invention can be tailored to provide optimal reaction to stresses in a variety of applications.

In a presently preferred embodiment, each cone of the internal structure contains a smaller inverted minor cone that is attached between an outer skin and the inner larger cone wall. The cones can be added in applications requiring additional structural support.

According to a preferred method of manufacturing the present invention, the cones are first coupled together forming an internal structure. The internal structure is then attached to a first skin. Before a second skin is attached to the internal structure, the partially completed structure is placed in a pressurized environment. The second skin is then attached to the other surface of the internal structure.

Another aspect of the preferred method of manufacturing the present invention comprises adding helium to the pressurized environment before the second skin is welded to the internal structure. Any outgassing of the sandwich structure can thus be more easily detected revealing flaws in the skin surface.

An additional aspect of the preferred method of manufacturing comprises using acid or heat sensitive mylar to transfer an image of the surface to be welded to the second skin as a template for welding. When the second skin is subsequently attached to the sandwich structure, the location of the underlying cones can be more accurately determined.

These and various other advantages and features of novelty which characterize the invention are pointed out with particularity in the claims annexed hereto and forming a part hereof. However, for a better understanding of the invention, its advantages, and the objects achieved by its use, reference should be made to the drawings which form a further part hereof, and to the accompanying descriptive matter, in which there is illustrated and described a preferred embodiment of the invention.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings embodiments that are presently preferred, with the understanding, however, that the invention is not limited to the specific methods and instrumentalities disclosed.

In the drawings.

DETAILED DESCRIPTION OF PREFERRED EMBODIMENTS

Figure 1:
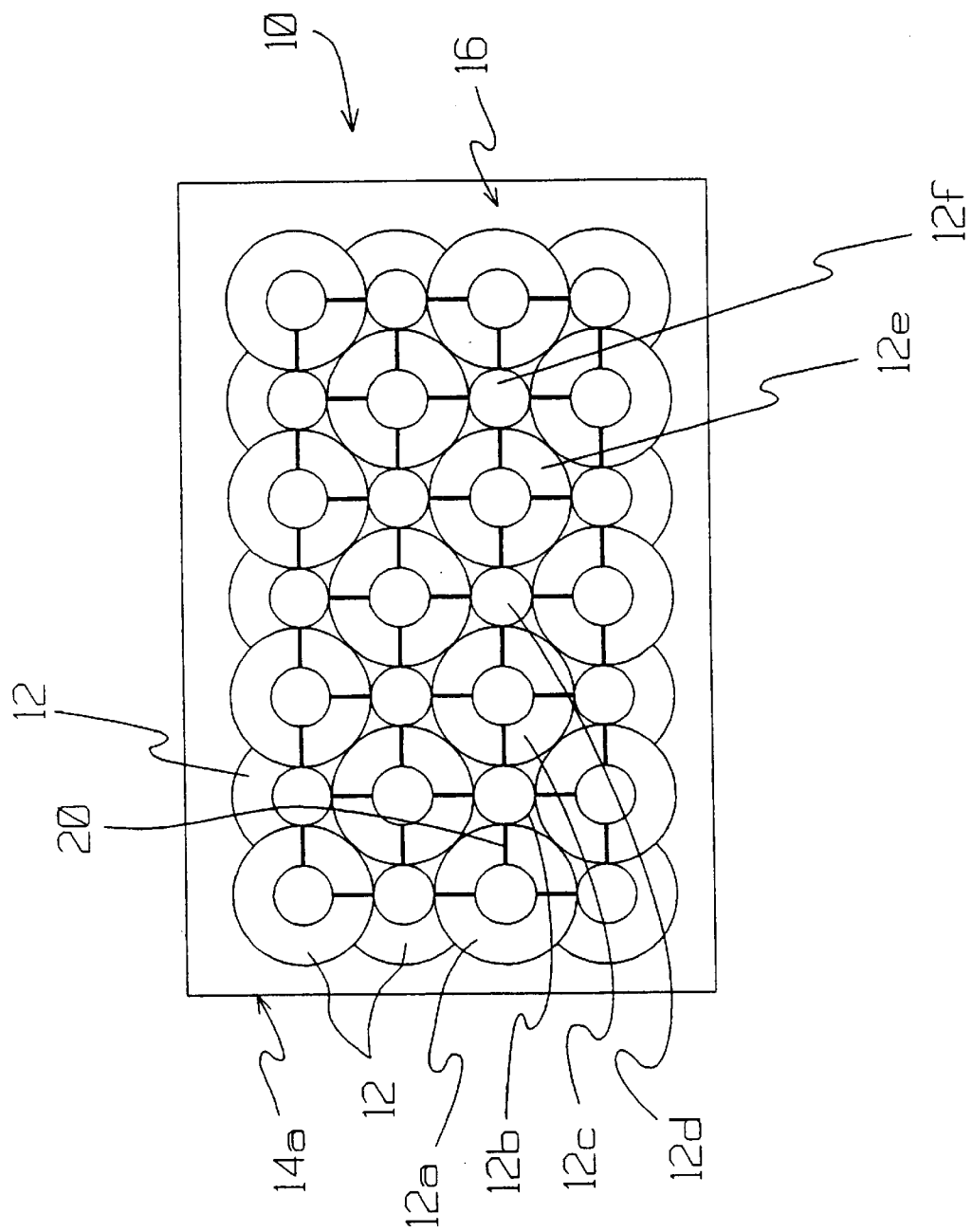
FIG. 1 illustrates a top view of a preferred embodiment of the present invention with the top skin removed revealing single cones and the weld lines between cones.
Figure 2:
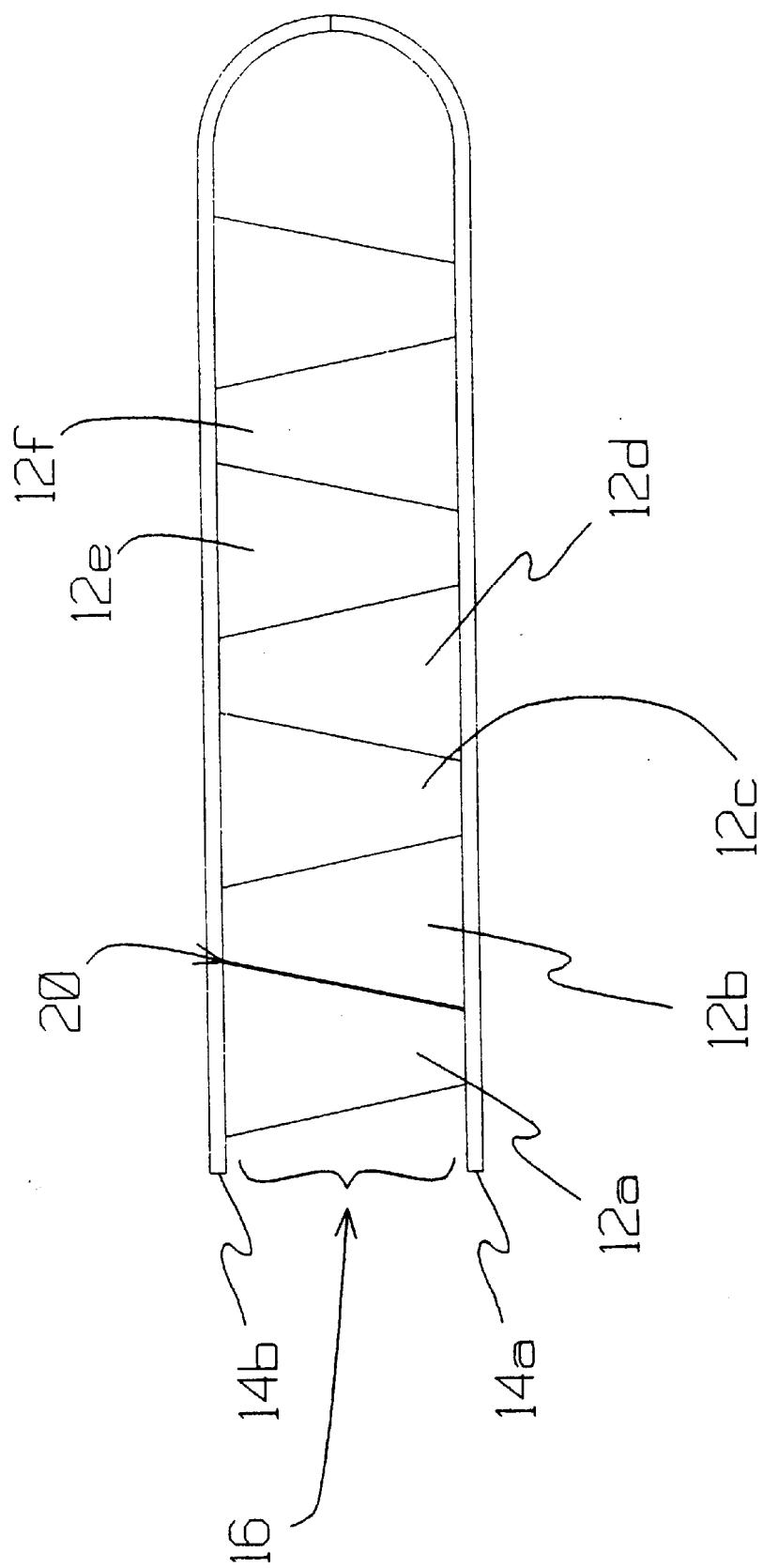
FIG. 2 illustrates a cut-away side view of a preferred embodiment of the present invention using single cones.
Figure 3:
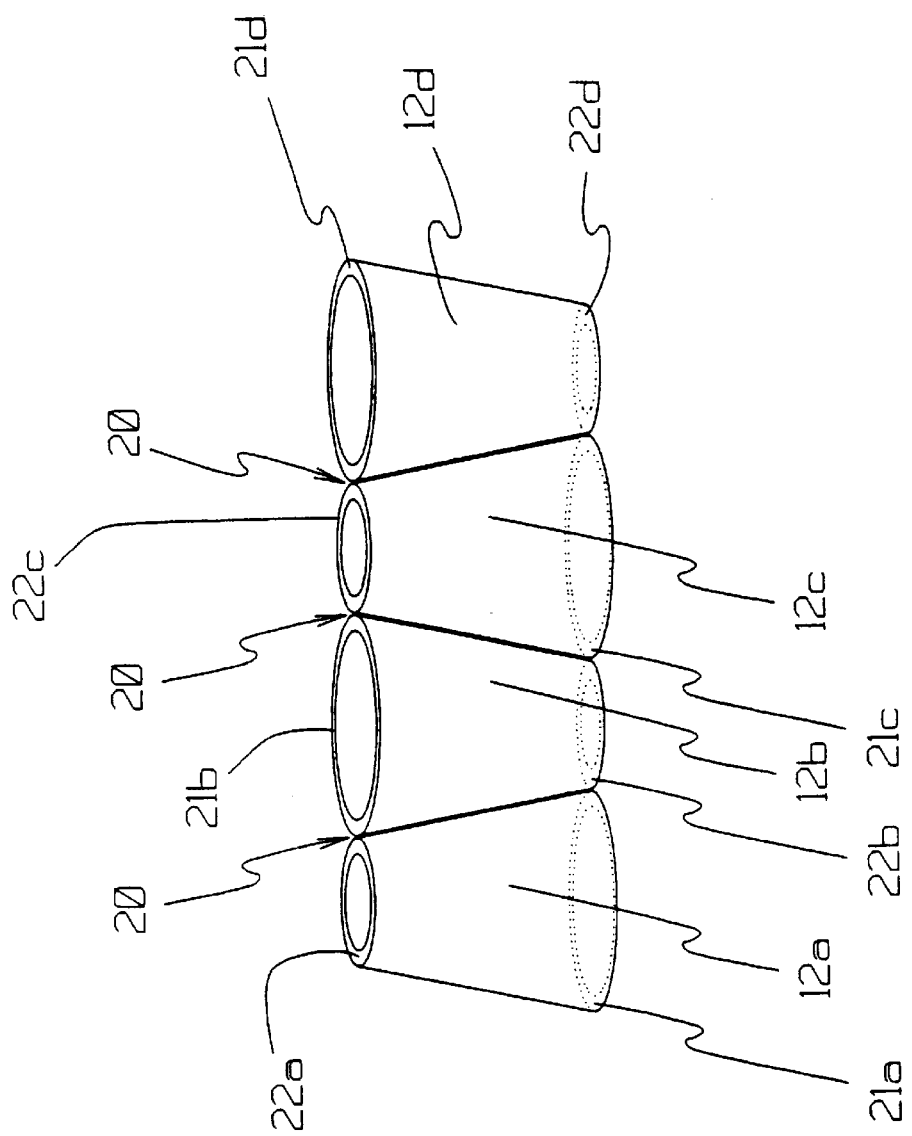
FIG. 3 illustrates a perspective view of the relationship of the cones within the body of the present invention using single cones.

FIGS. 1–3 depict portions of the sandwich skin construction 10. As shown, the cones 12 are distributed in a side-by-side arrangement with each cone 12 being inverted with respect to each adjacent cone 12. FIG. 3, wherein cone separation distances have been exaggerated for clarity, shows a perspective view of the cone 12 arrangement for a single row of cones 12. As illustrated, cone 12a is oriented with its base down; whereas, the adjacent cone 12b is oriented with its top down. This pattern continues with cone 12c again oriented with its base down and cone 12d oriented with its top down. Other cones 12, shown in FIG. 1, continue to repeat this pattern throughout the structure. As indicated by the weld lines 20, each cone 12 is welded to each adjacent cone 12 forming an internal structure 16. For example, cone 12b is welded to cones 12a and 12c as well as other adjacent cones along the outer surface where the walls of the respective cones 12a, 12b, and 12c meet. Moreover, the entire internal structure is sandwiched between two skins 14a and 14b. The entire sandwich skin construction is sealed along its periphery. Preferably, the skins 14a and 14b are bent over and welded together as shown in FIG. 2.

As can be appreciated from FIG. 3, each cone 12 has a hollow core, a base rim 21 and a top rim 22. Moreover, each cone 12 has an angle that is measure by an arc from the base of the cone to a wall. The base rim 21 and top rim 22 provide a surface area for welding a cone 12 to the skins 14a and 14b. For example, cone 12b is attached to a first skin 14a along its top rim 22b and is attached to a second skin 14b along its base rim 21b. The orientation of the cone 12 (i.e., upright or inverted) determines which rim 21 or 22 is attached to which skin 14a or 14b. As can be appreciated from the FIGS. 1–3, if a given cone 12 has its base rim 21 welded to the first skin 14a and its top rim 22 welded to the second skin 14b, then every adjacent cone 12 would have its base rim 21 welded to the second skin 14b and its top rim 22 welded to the first skin 14a. This weld of base rim 21 and top rim 22 to respective skins 14a and 14b forms a pressurized seal and anchors the skins 14a and 14b to the internal structure 16.

The interior of the sandwich skin construction 10 is pressurized with a gas to provide additional structural support without adding weight. Moreover, a doping gas, preferably helium, is added to the pressurized gas to provide a convenient means of leak detection. By testing the outer skin with a commercially available spectrometer, a leak would be indicated by an unusual level of helium.

The resulting pressure is application specific and is selected to maximize the strength of the sandwich skin construction 10, but will vary according to the application. In general, the pressure should approach the working pressure of the skin material selected. Working pressure of a material is determined empirically by the skin 14a and 14b and cone 12 material, the skin 14a and 14b and cone 12 thickness selected, and the welding technique used to anchor the skins 14a and 14b to the cones 12. For example, if a thin polycarbonate type material with a working pressure of approximately 150 psi is selected for the cones 12 and the skins 14a and 14b, then the internal pressure of the sandwich skin construction should also approach 150 psi. Importantly, the working pressure should be much higher than the atmospheric pressure to maximize the strength of the sandwich skin construction 10, but low enough so that the possibility that the sandwich skin construction could burst from overpressurization is minimized.

According to another aspect of the present invention, because each cone 12 is pressure sealed with respect to the skins 14a and 14b, a rupture in a skin 14a or 14b of the sandwich skin construction 10 will be localized. This ensures that a local rupture will not result in overall loss of pressure and structural integrity in the sandwich skin construction 10.

According to another aspect of the present invention, the angle of the cones 12 is selected to maximize the strength of the sandwich skin construction 10. By appropriately selecting the angle of the cones 12, a force incident upon the surface of the sandwich skin construction 10 would be transferred from one skin (e.g. 14a) to the other skin (e.g. 14b). For example, if the force incident upon the sandwich skin construction 10 is expected to be primarily frictional, the angle of the cone 12 would made more acute. Whereas, if the force incident upon the sandwich skin construction 10 is expected to be primarily compressive, then the angle of the cones 12 would be more normal relative to the skins 14a and 14b. Thus the angle of the cones 12 can be tailored to a specific application. Moreover, the angle of individual cones 12 could be adjusted on a local basis to provide optimized behavior to local stresses.

Figure 4:
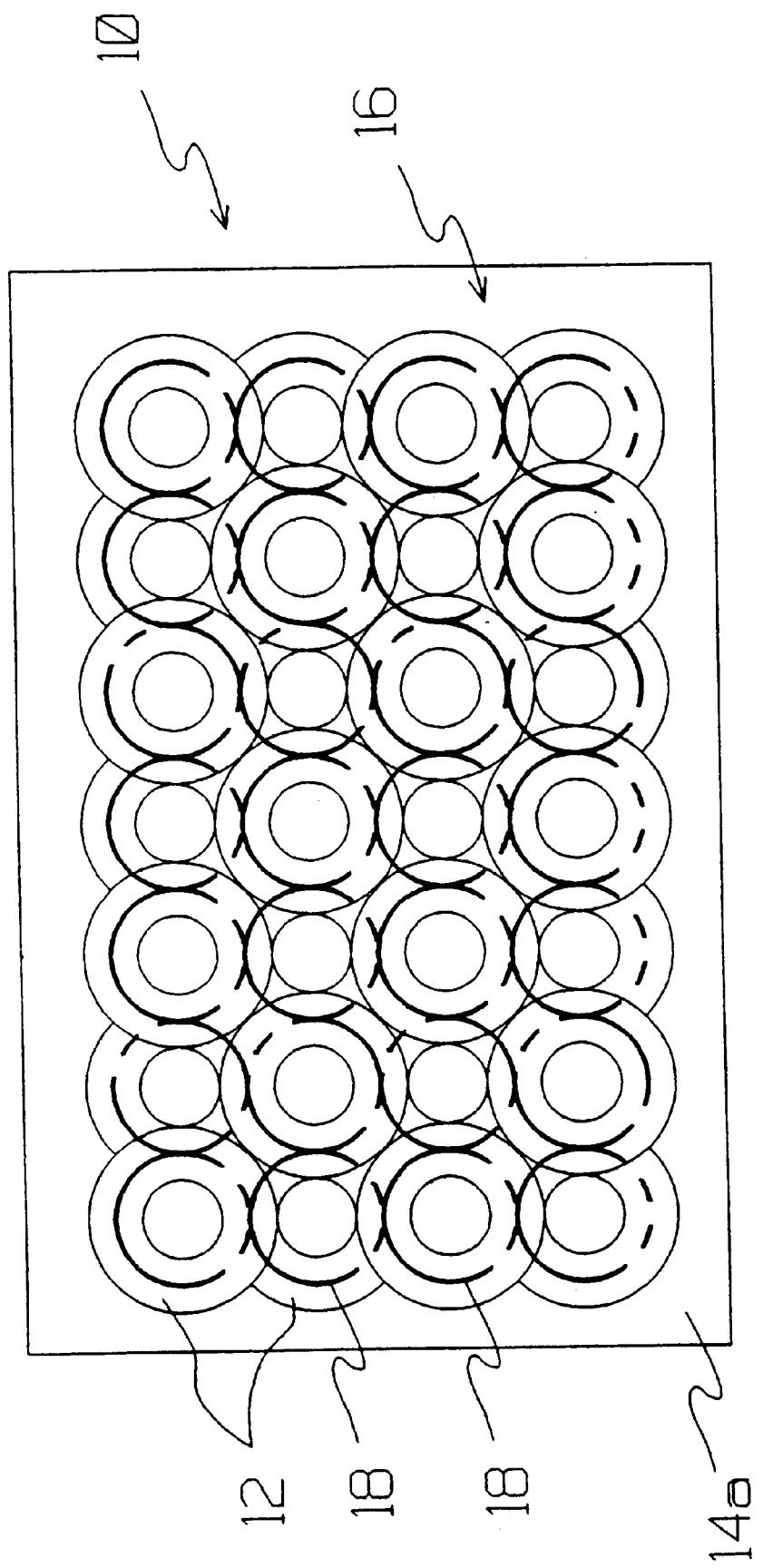
FIG. 4 illustrates a top view of a preferred embodiment of the present invention with the top skin removed revealing major and minor cones and showing the weld lines between major and minor cones.
Figure 5:
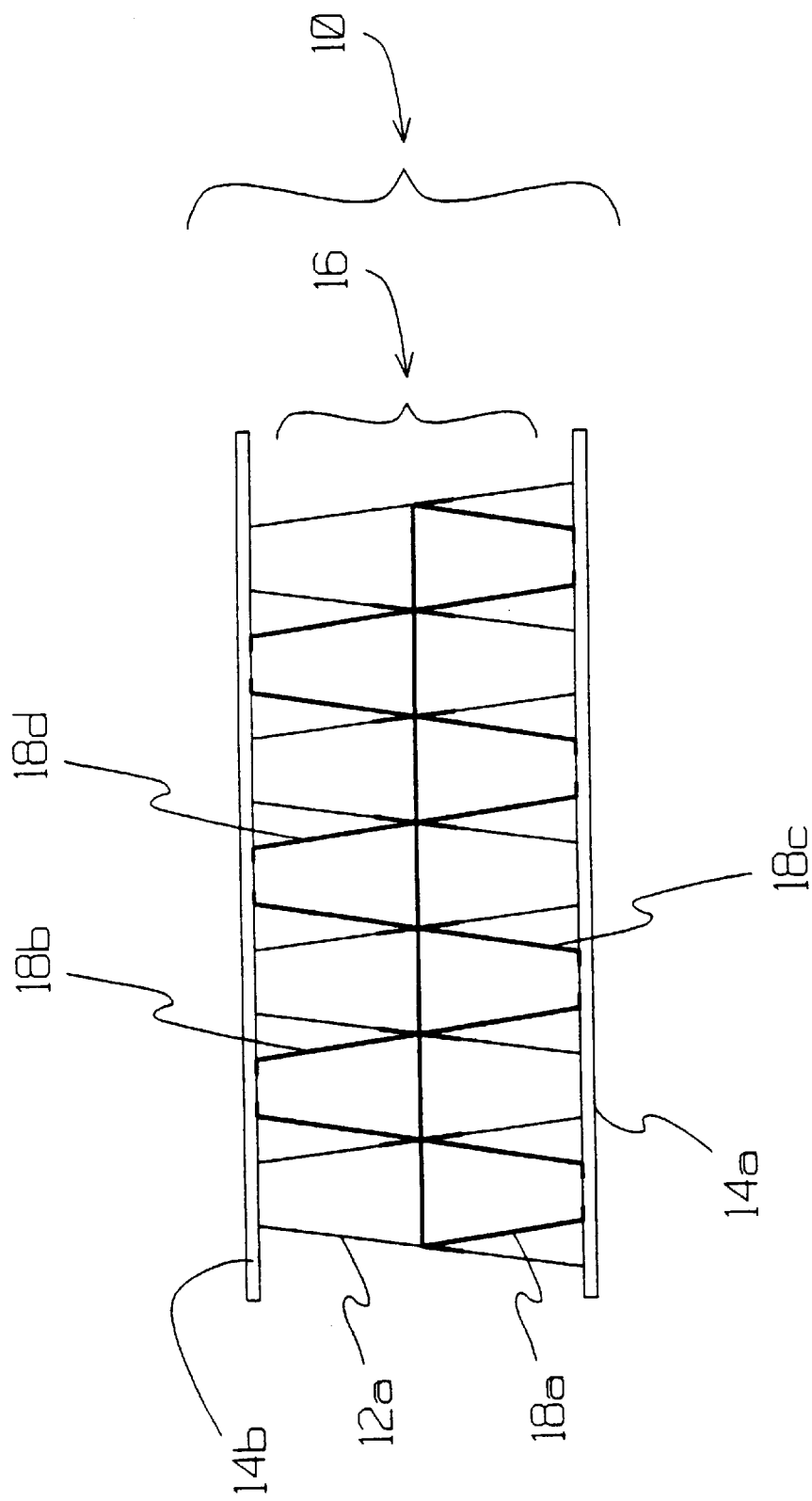
FIG. 5 illustrates a cut-away side view of a preferred embodiment of the present invention using major and minor cones.
Figure 6:
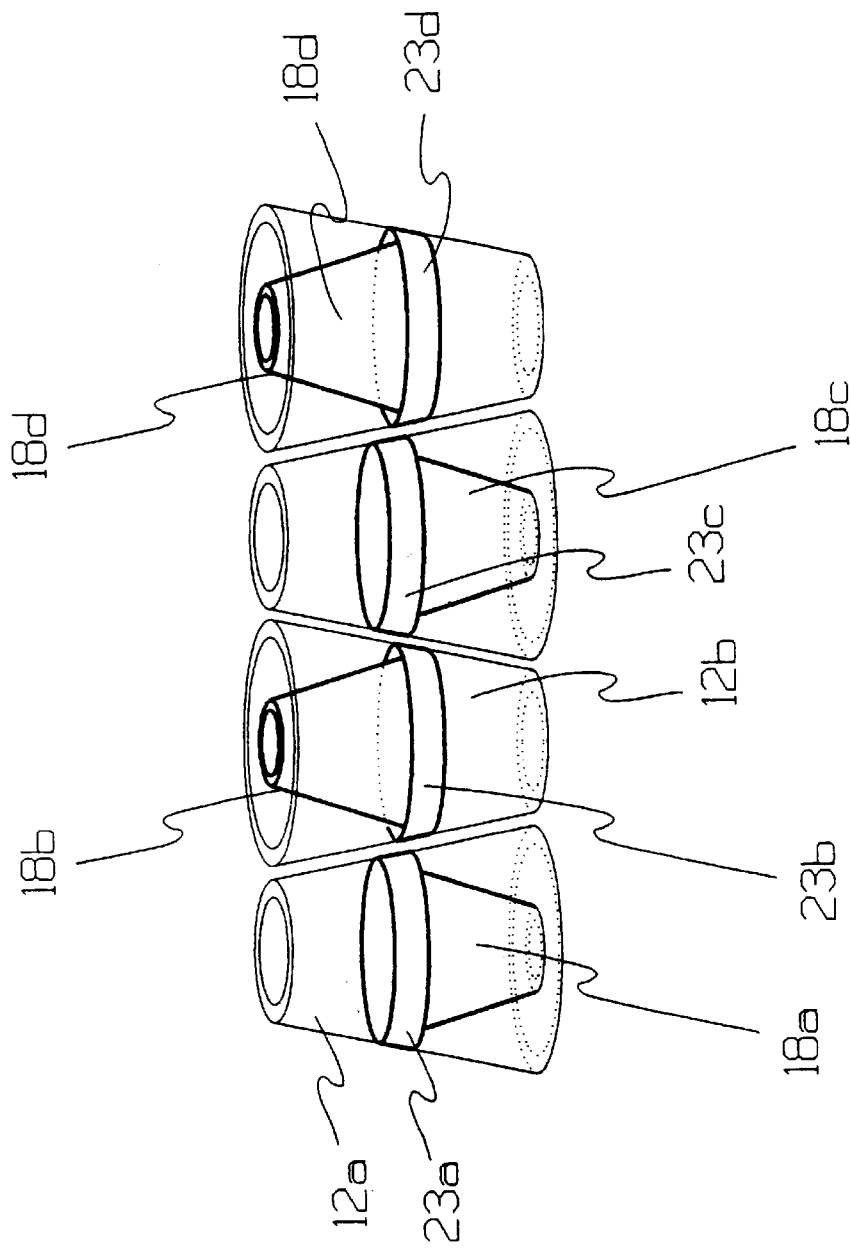
FIG. 6 illustrates a perspective view of the relationship of the cones within the body of the present invention using major and minor cones.

According to another embodiment of the present invention, when the walls of the cones 12 are thin relative to the height and bursting pressure of the cones 12, additional minor cones 18 are disposed within the cones 12. Adding the additional minor cones 18 would be preferable to increasing the wall thickness of the cones 12 if the overall weight contribution to the sandwich skin construction 10 is thereby minimized. As illustrated in FIGS. 4–6, a minor cone 18 is inverted with respect to each cone 12 and welded along the minor cone base rim 23 at the point where the base of the minor cone 18 contacts the interior of cone 12.

The diameter of the base of the minor cone 18 is selected such that the base of the minor cone 18 contacts a cone 12 at a predetermined point within the interior of a cone 12. In FIG. 6 for example, the minor cones 18 extend more than half-way up into the cones 12. The top of each minor cone 18 extends to the base of the cone 12. The top of each minor cone 18 thus extends to and contacts the first or second skin 14a or 14b.

According to a preferred method of manufacturing the sandwich skin construction 10, the cones 12 are first welded to each other forming an internal structure 16. If minor cones 18 are disposed within the cones 12, then a minor cone 18 is welded within each cone 12 before welding the cones 12 together.

After the internal structure 16 is formed, a first skin 14b is welded to the internal structure 16. The partially completed structure, cones 12 and one skin 14b, is placed in a pressure chamber in which the pressure is changed.

After the desired environmental pressure is achieved, the second skin 14a is welded to the remaining side of the internal structure 16. If minor cones 18 are disposed within the cones 12, then the internal structure 16 must be placed in a pressure chamber and the pressure changed before attaching the first skin 14b. Otherwise, non-pressurized pockets would form in the sandwich skin construction.

Figure 7:
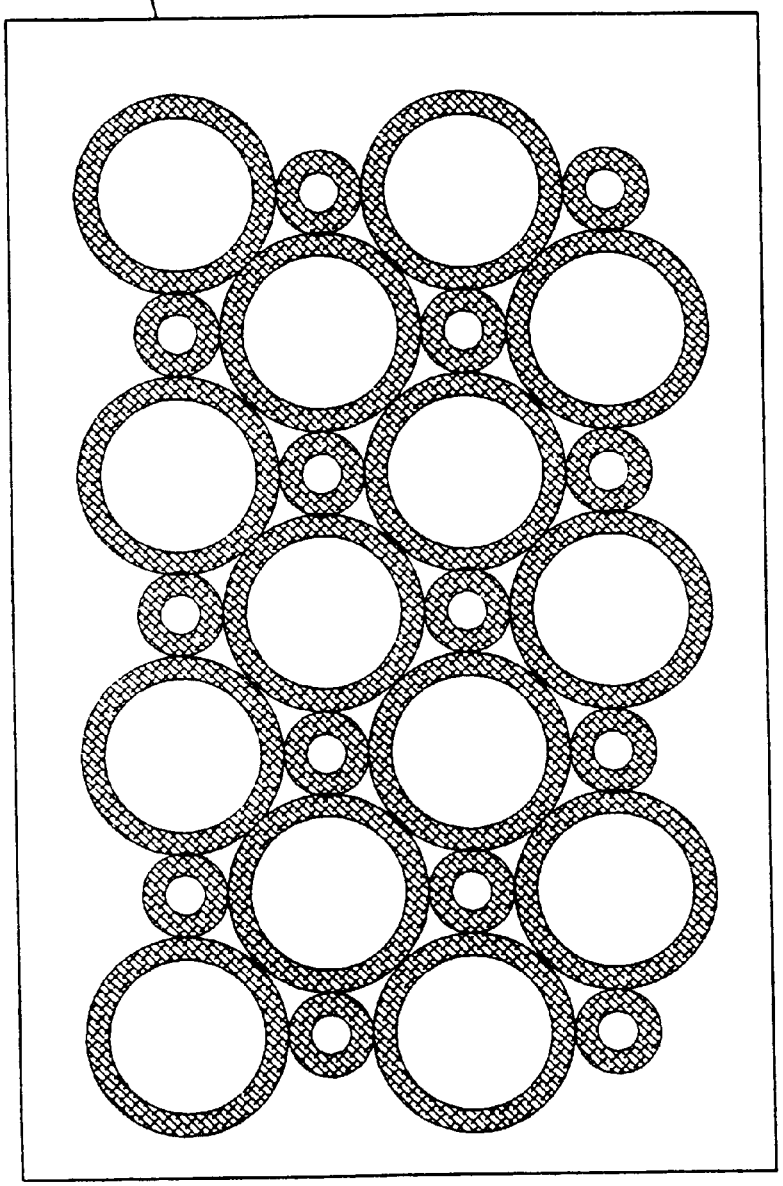
FIG. 7 illustrates a welding surface of a preferred embodiment of the present invention to be transferred to the second skin.
Figure 8:
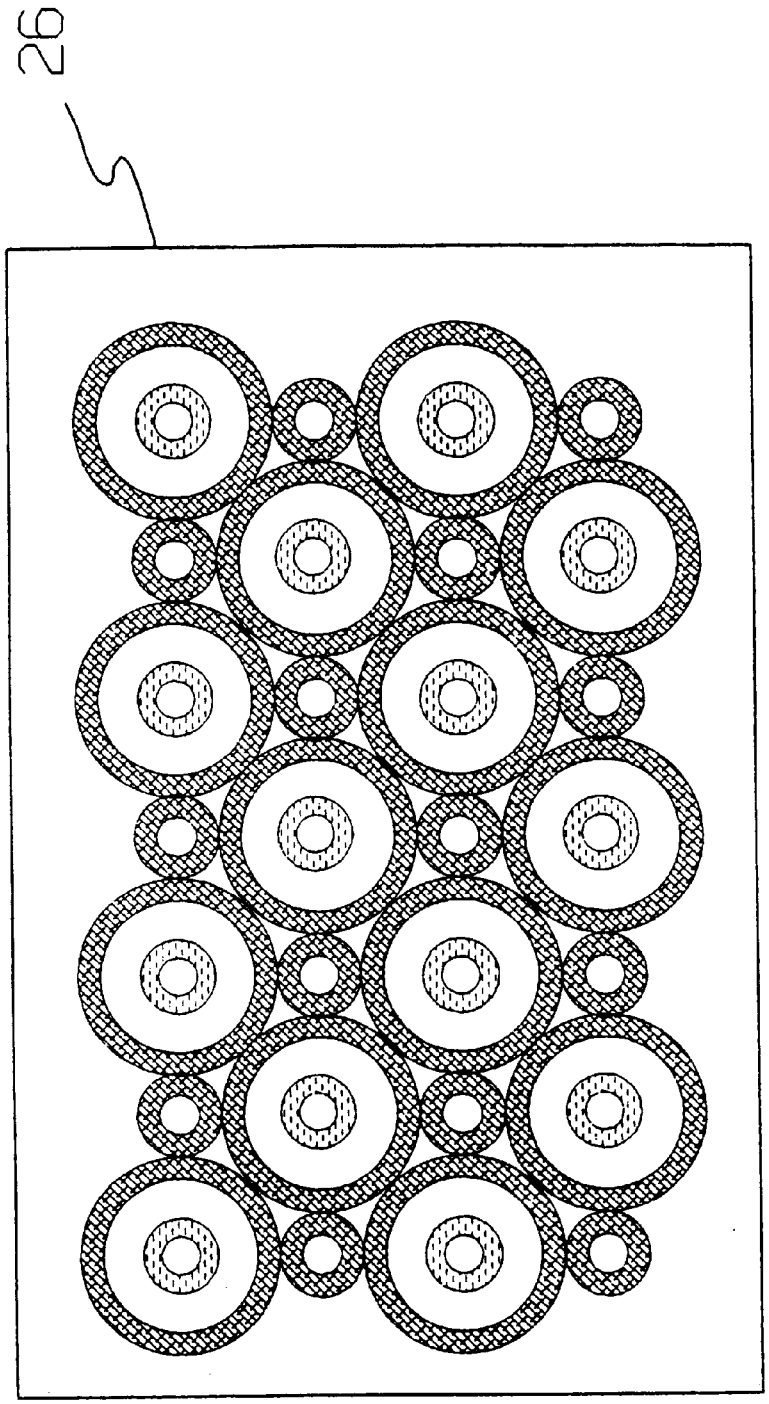
FIG. 8 illustrates a welding surface of a preferred embodiment of the present invention with major and minor cones to be transferred to the skin.

According to another aspect of the method of manufacture of the present invention, a mask is fabricated to transfer an image to the surface of skin 14a or 14b to improve the location of welds. Referring now to FIGS. 7 and 8, the weld surface 26 of the internal structure 16 is indicated by shading. FIG. 7 illustrates a mask for an internal structure consisting of cones without minor cones. FIG. 8 shows a mask with minor cones disposed within the cones. A heat source (not show) raises the temperature of the weld surface 26. A heat sensitive mylar is then placed on the weld surface 26, which creates an image of the weld surface 26 on the mylar. The mylar is then placed over the skin 14a which has been treated with a photosensitive coating. This mylar and skin 14a or 14b combination is then exposed to a light source. The light thus transfers the image to the surface of skin 14a.

According to another aspect of the method of manufacture, an acid sensitive mylar may be substituted for the heat sensitive mylar. In that instance, the weld surface 26 is treated with an acid. The acid sensitive mylar is then placed over the weld surface 26. After the acid has etched the image of the weld surface 26 through the mylar, the mylar is then placed over the skin 14a, which has been treated with a photosensitive coating. The skin 14a with the mylar is exposed to a light source, which transfers the image of the weld surface 26 to the skin 14a. Once the image of the weld surface 26 has been transferred to the surface of the skin 14a, using either the heat or acid method, the welding can proceed with much improved accuracy.

The present invention is not limited to the specific presently preferred embodiment described above. For example, the pressurized cells could be cylinders or polyhedrons rather than cones. Accordingly, the scope of protection of the following claims is not limited to the specific embodiments described in detail above, except where they may be explicitly so limited.

What is claimed is:

1. A method of manufacturing a sandwich skin construction comprising the steps of:
   (a) disposing a plurality of cone members side-by-side such that each cone is inverted with respect to each adjacent cone;
   (b) attaching a first skin to one side of said plurality of cones so as to form separate pressure seals at a top of selected ones of said plurality of cones;
   (c) pressurizing the external environment of said cones and first skin; and,
   (d) attaching a second skin to said plurality of cones on the side opposite of said first skin such that said first and second skin are substantially parallel, said second skin forming separate pressure seals at a bottom of said selected ones of said plurality of cones whereby each of said selected ones of said plurality of cones is separately sealed and pressurized.

2. A method of manufacturing a sandwich skin construction as in claim 1, wherein minor cones are disposed within said cones, further wherein said step of pressurizing the external environment is performed before said step of attaching a first skin, thereby avoiding non-pressurized cells in the sandwich skin construction.

3. A method of manufacturing a sandwich skin construction as in claim 1, wherein said cones are characterized by angles selected to oppose an expected force incident upon the surface of one of said first and second skins.

4. A method of manufacturing a sandwich skin construction as in claim 3, wherein said angles are individually selected throughout the internal structure relative to an expected localized force incident upon the surface of at least one of said first and second skins.

5. A method of manufacturing a sandwich skin construction as in claim 1 further comprising the step of adding helium to said external environment.

6. A method of manufacturing a sandwich skin construction as in claim 5, wherein the step of adding helium to said external environment is completed before attaching said second skin.

7. A method of manufacturing a sandwich skin construction as in claim 1 further comprising the step of transferring an image of one side of said cones to one of said first and second skin before the step of attaching the skin.

8. A method of manufacturing a sandwich skin construction as in claim 7 wherein the step of transferring the image is comprised of:
   (a) heating said cones;
   (b) laying a heat sensitive mylar over said cones whereby an image is created in said mylar;
   (c) treating the surface of at least one of said first and second skin with a photosensitive coating;
   (d) placing said mylar on the surface of the treated skin; and,
   (e) thereafter exposing said mylar and the treated skin to a light source.

9. A method of manufacturing a sandwich skin construction as in claim 7 wherein the step of transferring the image is comprised of:
   (a) treating the cones to be welded with an acid;
   (b) laying an acid sensitive mylar over said acid treated cones until said mylar is etched away where said mylar contacts said cones;
   (c) treating the surface of at least one of said first and second skin with a photosensitive coating;
   (d) placing said mylar on the treated skin surface; and,
   (e) thereafter exposing said mylar and the treated skin to a light source.

10. A method of manufacturing a sandwich skin construction, comprising:
   (a) disposing a plurality of cone members side-by-side such that each cone is inverted with respect to each adjacent cone;
   (b) attaching a first skin to one side of said plurality of cones;
   (c) forming separate pressure seals at the top of selected ones of said plurality of cones;
   (d) pressurizing said selected ones of said plurality of
   (e) attaching a second skin to said plurality of cones on the side opposite of said first skin such that said first skin and second skin are substantially parallel; and
   (d) forming separate pressure seals at the bottom of selected ones of said plurality of cones.

* * * * *

UNITED STATES PATENT AND TRADEMARK OFFICE
CERTIFICATE OF CORRECTION

PATENT NO. : 6,074,509
DATED : June 13, 2000
INVENTOR(S) : Douglas E. Pittman

It is certified that error appears in the above-indentified patent and that said Letters Patent is hereby corrected as shown below:

Column 5, line 2, please delete "show" and insert therefor --shown--;
Column 6, line 53, please insert --cones-- after the words "plurality of".

Signed and Sealed this

Twenty-second Day of May, 2001

Attest:

NICHOLAS P. GODICI

Attesting Officer	Acting Director of the United States Patent and Trademark Office